G. P. Gordon. Sheet 1. 3 Sheets

Printing Press.

No. 688. A.
No. 689. B.

Reissued Apr. 12. 1859

G. P. Gordon. Sheet 2. 3 Sheets.

Printing Press.

No. 688. A.

No. 689. B.

Reissued Apr. 12. 1859.

Sheet 3. 3 Sheets.

C. P. Gordon.

Printing Press.

No. 688. A.
No. 689. B.

Reissued Apr. 12. 1859.

UNITED STATES PATENT OFFICE.

GEORGE P. GORDON, OF NEW YORK, N. Y.

AUTOMATIC GRIPPER FOR CARRYING SHEETS OF PAPER IN PRINTING-PRESSES.

Specification forming part of Letters Patent No. 20,874, dated July 13, 1858; Reissue No. 689, dated April 12, 1859.

*To all whom it may concern:*

Be it known that I, GEORGE P. GORDON, of New York, in the county and State of New York, have invented certain new and useful Improvements in Automatic Grippers for Carrying Sheets of Paper in Printing-Presses; and I do hereby declare the following is a full, clear, and exact description thereof, reference being had to the annexed drawings and figures of reference thereon, the same mark of reference always denoting the same part in all the figures of the drawings.

Figure 1:
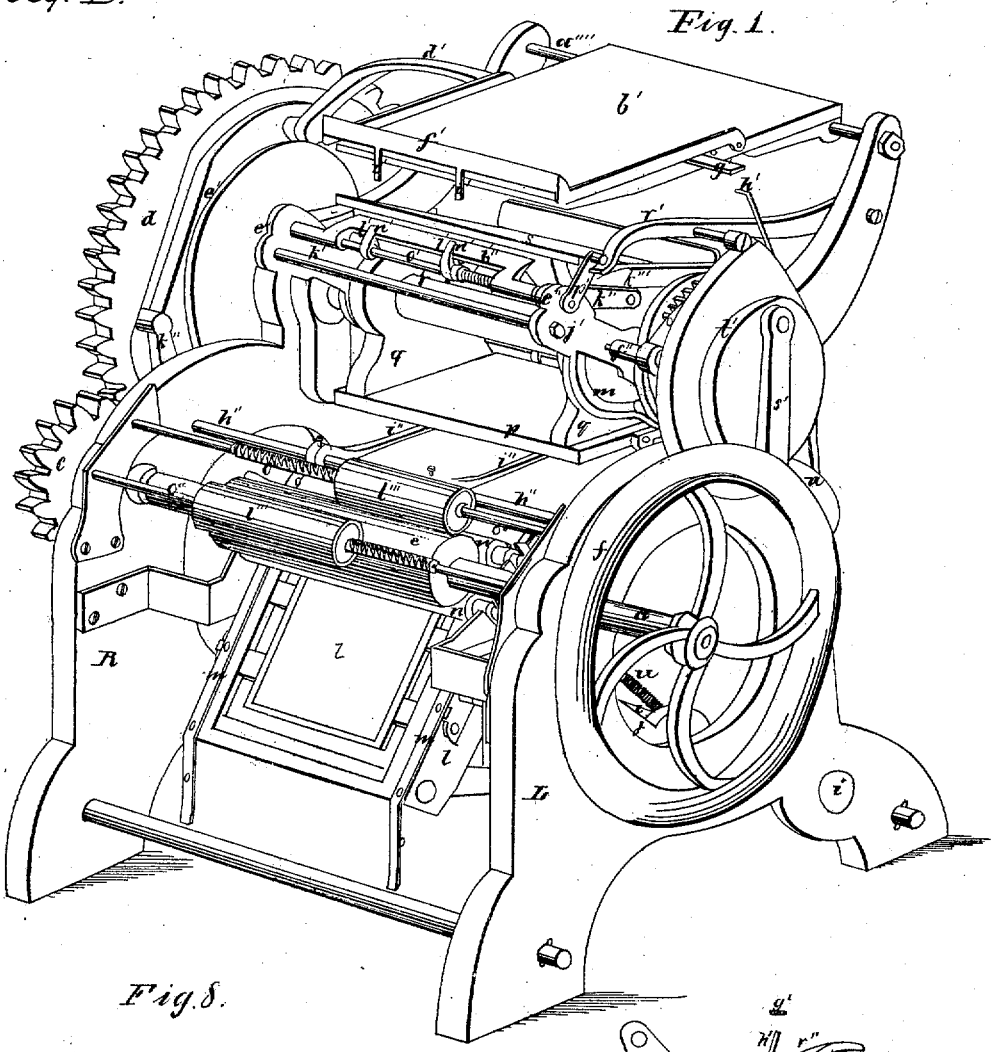
Figure 8:
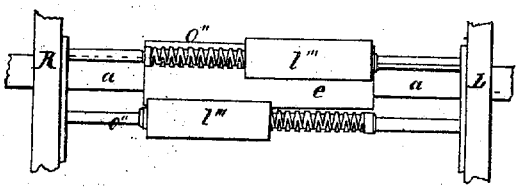
Figure 6:
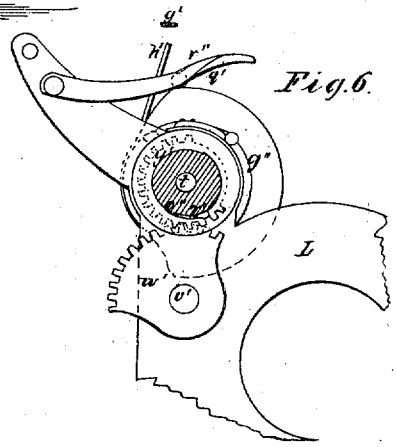
Figure 2:
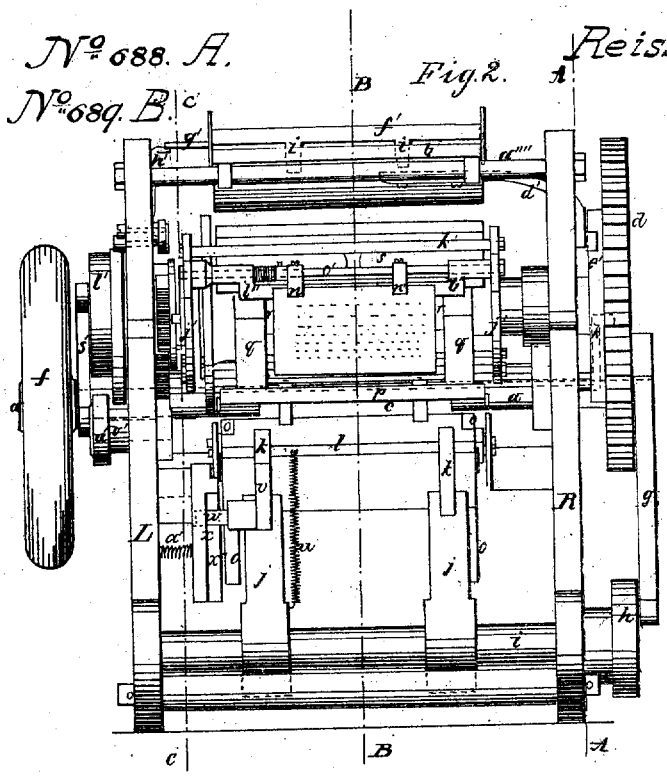
Figure 3:
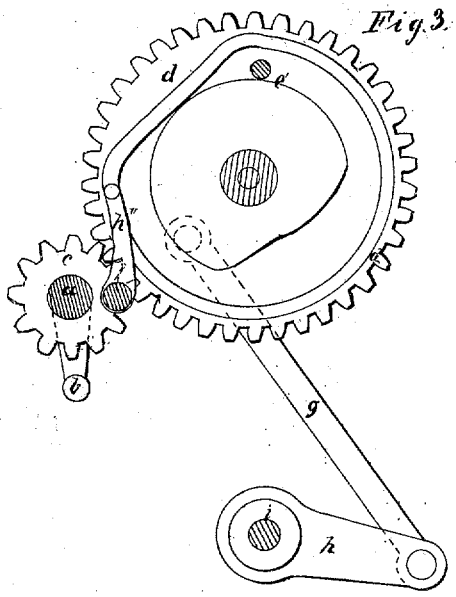
Figure 4:
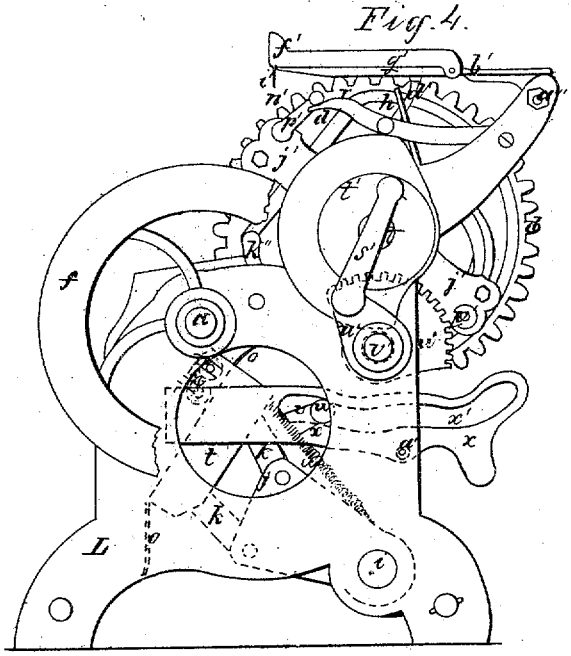
Figure 5:
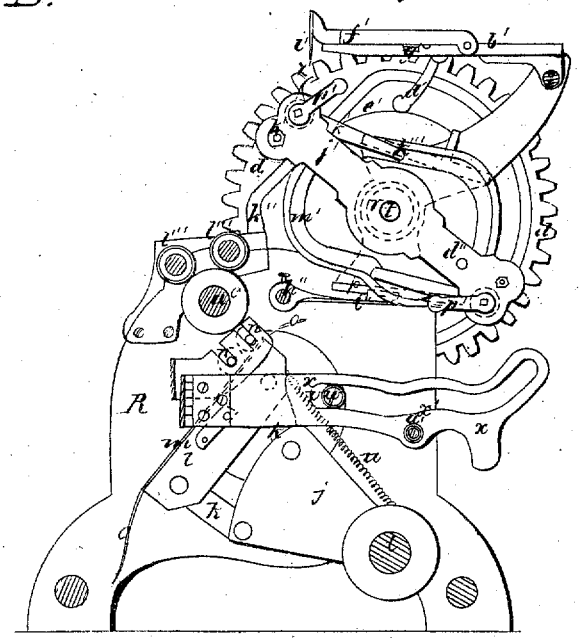
Figure 7:
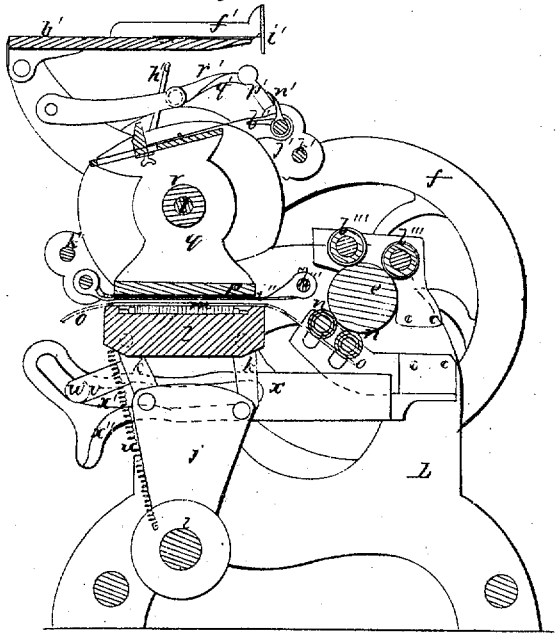

In the drawings, Figure 1 is a perspective view taken at the back of the machine or opposite where the person feeding the paper is to stand. This shows the guides to lay the sheet against and the grippers about to take the laid sheet, the platen with the spring-strips to hold the sheet up to the platen while the impression is being taken and until the form of types has relieved itself from the sheet. It also gives the relative positions of the distributing-cylinder, the inking-rollers, and the bed at the time one sheet is about to be received by one set of grippers and the second set of grippers is on its transit toward the place of depositing the sheet of paper after it is printed. These last named operations follow one after another in rapid succession as the gripper frame or arms revolve on their axis. Fig. 2 is an elevation of the front or feeding side of the machine, and shows the position of all the parts which may be seen from a plain front side view of the "press," the red lines A A, B B, and C C showing where the sectional divisions take place; also showing (in red lines) the sheet in its progress toward being deposited on the pile-table, as will be more fully described hereinafter. Fig. 3 is a section outside of the frame, but inside of the gearing and cams, taken as marked, at the line A A in Fig. 2 near the R side of the frame, showing the hollow cam for controlling the strips to hold the sheet up to the platen, and the outside cam to raise the feed-board and allow it to fall at the proper time. This also shows the crank from the main wheel to the shaft of the impression-works through the connecting-rod, the dotted lines indicating the parts which would otherwise be hidden from view. Fig. 4 is a view from inside the R side of the frame, showing the position of the several parts from that point in sectional elevation, as indicated by the letters of reference. Fig. 5 is a view of the interior of the press, taken at the line C C in Fig. 2, indicating the parts as per letters of reference inside the L side of the frame. Fig. 6 is a special section looking from the L side of the frame toward the said side of frame, showing the two segments of cog-wheels, as named by the letters of reference. Fig. 7 is a section through the center of the press in full elevation, as taken at the line B B, Fig. 2. Fig. 8 is a front view of the distributing-cylinders of the inking apparatus, showing their means of traveling one across opposite the other, so as to carry the ink from the center to the end and return, thus giving extra distribution to the ink.

The nature of my invention consists in, first, the providing a feed-board which, working upon its axis, will vibrate by rising so that the grippers of a revolving gripper-frame may pass underneath the feed-board said feed-board dropping down at the proper time to give the sheet of paper, which has been fed to the gage, to the gripper which has just now passed from under the feed-board, as here shown, reserving the privilege of changing the arrangement of parts by some equivalent machinery, or in some change of forms or positions of the parts thereof; second, in providing a revolving frame of grippers, which alternately stops for the impression and revolves to carry the sheet to be printed, and thence to be delivered in a regularly-piled heap, not intending to confine myself to both these operations, as either of them will be just as well performed separately. One or many sets of grippers may be used in this manner, but I give the preference to two sets, as here shown, the one to be at the impression and the other at the place of delivery or piling the sheet at the pile or fly board. The sheet is dropped just before the frame stops to allow an impression to be taken. This done, the frame of grippers moves on half a revolution, when one gripper occupies the position its predecessor had done, (that is, as shown in the model,) and so continuously onward, one following the other. The sheet of paper, when taken by the grippers from the feed-board, is held by the said grippers until it is desired they should release it, whether this be at the impression or to be piled upon the pile or fly board.

To enable others skilled in the art to make and use my invention, I will now describe its construction and operation.

I provide a revolving frame of grippers, or several sets of grippers, nippers, or paper-holding fingers, constructed in some suitable forms to grip or impinge upon the sheet of paper and hold it firmly until it is relieved by the grippers opening to drop and pile it upon the pile or fly board at the proper time. The gripper takes the sheet of paper or card from the feed-board $b'$ and thence conveys it to the place of impression, where it may rest until the impression is given. It is then, while yet held in the grippers, carried out from between the spring-strips or frisket and the platen, thence onward until it is over the pile or fly board, when the grippers open and drop the sheets, one after the other, against the gage $x'''$, which from its position allows the sheet to fall against this ledge or gage, before named. Thus the sheets will be regularly piled, one directly on top of the other. One or many sets of grippers comprising one frame may thus be made to perform these offices, one set succeeding the other, yet each meeting in turn the various parts for operating and receiving the various manipulations, so that the several sets of grippers will perform like offices in their regular turns and produce precisely the same results as though but one set of revolving grippers had been used. The grippers, one single set or many sets, are to always revolve upon their own independent axis without regard to those parts of the machine which perform the other manipulations not particularly pertaining to the sheet feeding and piling. The base or axis of this frame of revolving grippers is the main shaft $t$, which being snugly fitted to the fixed tube $r$ allows the said shaft $t$ to revolve within such tube in order that the shaft may perform its other duties. The tube $r$ extends from the one side of the frame to the other, and is in one piece. The arms or side of the gripper-holding frame has its hub or projecting sides, and these hubs fit close to and revolve upon the before-named fixed tube. The gripper-holding arms or frame extend a proper length from the center of the main shaft $t$, so that all the sets of grippers which may be placed in a frame will hold corresponding distance from the center of the main shaft. Upon each side of the platen is a corresponding arm or side of frame. I intend to use as many of these sets of grippers or arms as shall be found useful, be the same more or less. Near the outside or ends of these arms or frames is a brace extending from the one side of the frame to the other on the opposite side, and firmly connects the two arms or frames together, thus forming a frame to carry the grippers, one pair of arms being necessary to carry one set of grippers. The arms or frame for the grippers will be known as $j'$, the connecting-rods as $k'$, and the grippers as $l'$. These grippers have several parts connected with their opening and closing, which they meet in course of their revolution. In the drawings here presented two sets of grippers are shown. The sheet of paper being held in one, may be receiving the impression, while the other is at rest to receive the next or succeeding sheet. The gripper is made up of two parts, the lower one, $l''$, being a straight bar across that part which covers the width of the sheet, or as far as the width of the platen is presented to it. It then cranks off to its journals. Upon one end is an arm, $k''$, having attached to its side, near the end, a stud for a frictionless roller, $k'''$. This works in the hollow cam $m'$, as seen at Fig. 5, which governs, guides, and controls it in its several motions around the fly-board and the platen. This base piece $l''$ must be always held firm in its respective positions. The upper part or fingers, $n'$, are fast upon a shaft, $o'$, but are held in place by set-screws, so that the fingers may be moved upon their shaft to accommodate different size sheets of paper. The shaft $o'$ extends entirely across the press, one end projecting outside of the gripper-frame to receive the crank $p'$, by which they are opened at the proper time. A spiral spring upon the shaft $o'$ serves to close and keep closed the grippers during all the time when they are to be closed for the purpose of carrying the sheet of paper to its several positions until it is relieved by the action of the lever-cam $q'$, which has its fixed point upon the L side of the frame, as shown at Fig. 7, its opposite end being an elongated cam. An arm upon its side extends over the frame, so that a frictionless roller upon its end will rest upon the outside cam, $r'$, the two cams $r'$ and $q'$ giving the crank $p'$ the requisite motion to open the grippers at the proper time to deliver one sheet and receive another.

To drive the revolving frame of grippers the following parts are used to perform their various manipulations: Outside the L side of the press a connecting rod, $s'$, is at one end made fast to wheel $t'$, eccentric from its shaft, (see Fig. 4,) the opposite end being attached to the crank $w'$, which is fast upon its shaft $v'$. Upon the same shaft, inside of the L side of the frame, is a segment, $w'$, which is fast upon the same shaft, the relations of these parts being that the eccentric movement given the connecting rod, and thence to the crank $w'$, causes the shaft $v'$ to rock or vibrate backward and forward, giving like motion to the segment $w'$. A second segment, $y'$, (see Fig. 6,) is geared with the segment $w'$, and by a pawl, $z'$, held in place by the spring $c'''$, and by means of teeth, pushes the frame of grippers around to its proper place of rest. The segment $y'$ is loose upon its central bearing, being the tube $r$, so that it may freely revolve upon the outside of the said tube. Thus at the proper time the pawl acts upon the teeth and pushes the frame of grippers around the required distance, and then while the gripper-frame is at rest allows the return motion of the segment $w'$ to bring back the segment $y'$, when it is ready to repeat the same operation, and so on continuously.

For the purpose of holding the grippers and gripper frame perfectly firm at their stationary point—viz., the receiving the impression at one point and a sheet at another—a fixture, $d''$, is affixed on the L side of the press, an opening or openings are made in the side of the revolving gripper-frame $c''$, and a barrel or tube, $f''$, has within it a piston, around which is a spiral spring. This piston is operated upon by the cam $g''$ to force it into the opening in the side of the gripper-frame, which, when forced home, must fit it snugly, (this is $e''$,) and is to hold the frame until it is to be relieved, when the cam allows the spring to withdraw the piston and allows the gripper-frame to advance until the next set of grippers is operated upon in like manner. The motions and stops of the revolving frame of grippers continue alternately. To keep the sheet up to the platen, I provide spring-strips extending across the platen-face. These are fast with a rock-shaft, $h''$, the strip being $i''$. A crank upon the end of the shaft $h''$ is made to operate in the cam $k''$, which causes the strips to be lowered out of the way when the sets of grippers are to pass, and to bring them up to the sheet and the platen at the proper time to hold the sheet in place. A frisket may be used instead of the spring-strips if desired, the same being properly constructed to meet the other parts in proper time. The feed-board is made to rise and fall, so that its back end may go down to give the sheet to the grippers, and then to rise out of the way for the revolving grippers, so that they may pass underneath it. The fly or pile board has no peculiarity except what is herein stated. Its position is readily understood by reference to Fig. 7, where the sheets of paper (red lines) are seen upon the board which has a gage-piece at or near its lower edge, with a set-screw to slide it up to meet sheets of different sizes. (See $x'''$ in drawings.) Should it be found necessary this fly board always remains stationary when the machine is in operation, as here shown; but it may receive motion, if desired, by any common contrivance. A shaft, $a''''$, extends across the machine, and this is hinged to the board $b'$. From the side of this board, extending over the frame, is an arm, $c'$, having a frictionless roller, $d'$, arranged to run over the raised or outside cam $e'$ upon the back side of the main wheel and near the R side of the frame. This cam will be fully seen at Fig. 3. Its office is to raise and lower the back end of the feed-board at the proper time, so that which has been properly placed against the gage $f'$ is carried down so that it may be received by the grippers. The gage $f'$ is hinged to the sides of the feed-board, its front having upon it several points or brackets, which, when the feed-board is up, fall below the edge of the feed-board. At this time the sheet is to be placed against the gage. Upon the side of the gage an arm, $g'$, extending over the L side of the press or frame, where a stationary stud, $h'$, is placed to limit the distance the gage may fall, so that the end of the feed board may go down and deliver the sheet to the grippers underneath the gage-points $i'$. It will thus be seen that at the delivery of each sheet the feed-board comes up and goes down, first to receive the sheet properly against the gages, and the last to carry it to the grippers without the sheet changing its position until taken by the grippers.

I have here shown two sets of grippers, but intend to use any number of sets, arranging the stops according to the number of such sets which it may be found useful to apply. As arranged here, the frame of grippers revolves around the platen, which is stationary.

I do not intend to confine myself to the particular arrangements as shown, for many equivalents can be suggested to fill like offices, as do most of the parts of this machine. For instance, the bed might be stationary, so that the frame of grippers would revolve around this instead of the platen; or a cylinder or segment of a cylinder might be so placed as to serve in the place of either bed or platen, or both of them. Other forms or shapes may therefore be adopted, so as to allow the frame of revolving grippers. The same being independent of the other parts of the machine, may revolve so as to come to the place of receiving the sheet to be conveyed to some proper destination, viz: The sets may merely take the sheet to the place of impression, while the next set or some succeeding one will receive it and carry it to the place of deposit or piling. Again, the set of revolving grippers may take the sheet from the place of impression to the place of piling, as either or any of these operations separately may be equally well performed as if the whole were used in combination, or some parts of them.

I deem it to be wholly unimportant what machinery may be used for inking or the impression, but intend to use my sets of independent revolving grippers to take the sheets of paper and carry them to a given place, especially to a place for allowing the sheets to fall in an even pile, one on top of the other, as they are relieved from the grippers by the grippers themselves when they open for this purpose. It is quite immaterial whether the revolving nippers or grippers move continuously or whether I give them an intermittent motion.

Although in the plan I have presented for using these grippers they perform a greater amount of manipulations or duty than simply piling the sheet, I have adopted the intermittent motion; but when used for piling alone they may receive a continuous or progressive onward movement, and one or more sets, as may be deemed best, may be used, the main object being to take and pile the sheets by means of revolving grippers, which may act independent of the other parts of the machine, and this without regard to the time, place, or manner in which the sheet may be fed or supplied to such grippers, intending to use either of the plans described or their equivalents.

Operation: A sheet being fed or placed against the gage or guide, the press being in position, as shown at Fig. 1, the grippers being now ready to receive the sheet, the feed-board will lower on moving the press and present the sheet to the grippers, which immediately close upon the sheet, holding it firmly, and then in their onward movement carry the sheet to the platen. On its arrival at that point the spring-strips or frisket presses it firmly up to the face of the platen. The sheet having received its impression and been relieved from the form, as well as from the spring strips or frisket, is by the next move of the grippers conveyed to its place of deposit, where it is dropped upon the pile or fly board.

Having thus fully described my invention, what I claim as new is—

1. One or more sets of grippers, nippers, or fingers to revolve independent in themselves upon an axis, for the purpose of carrying the sheets of paper to the place of impression, or for carrying the sheet after it has received the impression to its place of deposit upon the pile-board or fly-board, or for either or both of these purposes, thus receiving and piling the sheets of paper in an even and regular heap by the acts of my automatic grippers or independent revolving nippers or their equivalents.

2. The combination of the independent revolving grippers with the vibrating feed-board or its equivalent.

3. The combination of the independent revolving grippers with a pile or fly board, to be used as described or in some equivalent way.

4. The combination of the independent revolving grippers with a feed-board, and a pile or fly board or their equivalents, substantially as herein described and set forth.

GEO. P. GORDON.

Witnesses:

J. L. KINGSLEY,

A. TURNER.